(12) United States Patent
Chou

(10) Patent No.: US 7,254,012 B2
(45) Date of Patent: Aug. 7, 2007

(54) KEYBOARD HAVING A LIFTING LID AND A REPLACEABLE PANEL

(75) Inventor: Chin-Wen Chou, Hsin-Tien (TW)

(73) Assignee: Zippy Technology Corp., Taipei Hsien (TW)

( * ) Notice: Subject to any disclaimer, the term of this patent is extended or adjusted under 35 U.S.C. 154(b) by 449 days.

(21) Appl. No.: 10/982,792

(22) Filed: Nov. 8, 2004

(65) Prior Publication Data

US 2006/0098397 A1     May 11, 2006

(51) Int. Cl.
G06F 1/16 (2006.01)
(52) U.S. Cl. .................. 361/680; 400/472; D14/455
(58) Field of Classification Search ................ 361/680; D14/392, 398, 455–461
See application file for complete search history.

(56) References Cited

U.S. PATENT DOCUMENTS

| 4,456,315 A | * | 6/1984 | Markley et al. | ............ 361/680 |
|---|---|---|---|---|
| 4,847,798 A | * | 7/1989 | Kurashima | ................... 361/680 |
| 6,039,478 A | * | 3/2000 | Chou | ......................... 400/472 |
| 6,147,858 A | * | 11/2000 | Takahashi | .................... 361/680 |
| 6,259,597 B1 | * | 7/2001 | Anzai et al. | ................. 361/680 |
| 6,439,785 B1 | * | 8/2002 | Liu | ............................. 400/472 |
| 6,489,949 B1 | * | 12/2002 | Yin | ............................. 361/680 |
| 6,618,242 B2 | * | 9/2003 | Garel et al. | ................. 361/680 |
| 2004/0085716 A1 | * | 5/2004 | Uke | ............................. 361/680 |

* cited by examiner

*Primary Examiner*—Lisa Lea-Edmonds
(74) *Attorney, Agent, or Firm*—Birch, Stewart, Kolasch & Birch, LLP

(57) ABSTRACT

A keyboard having a lifting lid and a replaceable panel includes a keyboard body, a see-through upper lid made from a transparent or translucent material to cover the keyboard body and an ornamental panel sandwiched between the keyboard body and the upper lid on a keyboard non-operation zone. Users can replace a desired ornamental panel whenever desired to enhance the total aesthetic appealing of the keyboard body.

10 Claims, 6 Drawing Sheets

KEYBOARD HAVING A LIFTING LID AND A REPLACEABLE PANEL

FIELD OF THE INVENTION

The present invention relates to a keyboard having a lifting lid and a replaceable panel and particularly to a keyboard for data entry that has an ornamental panel which is replaceable by users whenever desired.

BACKGROUND OF THE INVENTION

Conventional keyboards, based on the profile, may be categorized as follow:

1. Standard keyboard: It is rectangular with parallel sides and often gives people a plain and dull impression.

2. Ergonomic keyboard: It has a slightly curved profile and bracing boards on the lateral sides of the keyboard to extend the width of the keyboard to support user's wrists.

3. Separated keyboard: The keyboard is divided into two portions.

4. Wireless keyboard: It is free from the constraint of the transmission line and operable within a selected range.

In terms of functions, the present keyboard can be used to issue commands or input data to the computer. Some keyboards have a touch panel, mouse wheel, hot key, or the like. But the profile does not change very much. Some have varying colors on the outer frame or button keys. Some others have a patterned plastic membrane covering the outer frame. The profile of the outer frame does not have much alteration except the color on the surface. Hence they generally look plain and dull, and offer little feature to differentiate with other keyboards. It is a drawback and cannot meet user's requirement that demands novelty and is fashion-conscious.

SUMMARY OF THE INVENTION

The primary object of the present invention is to solve the aforesaid disadvantages. The invention enables users to change the outside appearance of the keyboard body whenever desired. The keyboard body is covered by a transparent or translucent see-through upper lid, and an ornamental panel is sandwiched between the keyboard body and the see-through upper lid on a keyboard non-operation zone. The upper lid may be opened to replace the ornamental panel whenever users desire. Thus the aesthetic appealing of the entire keyboard body improves.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
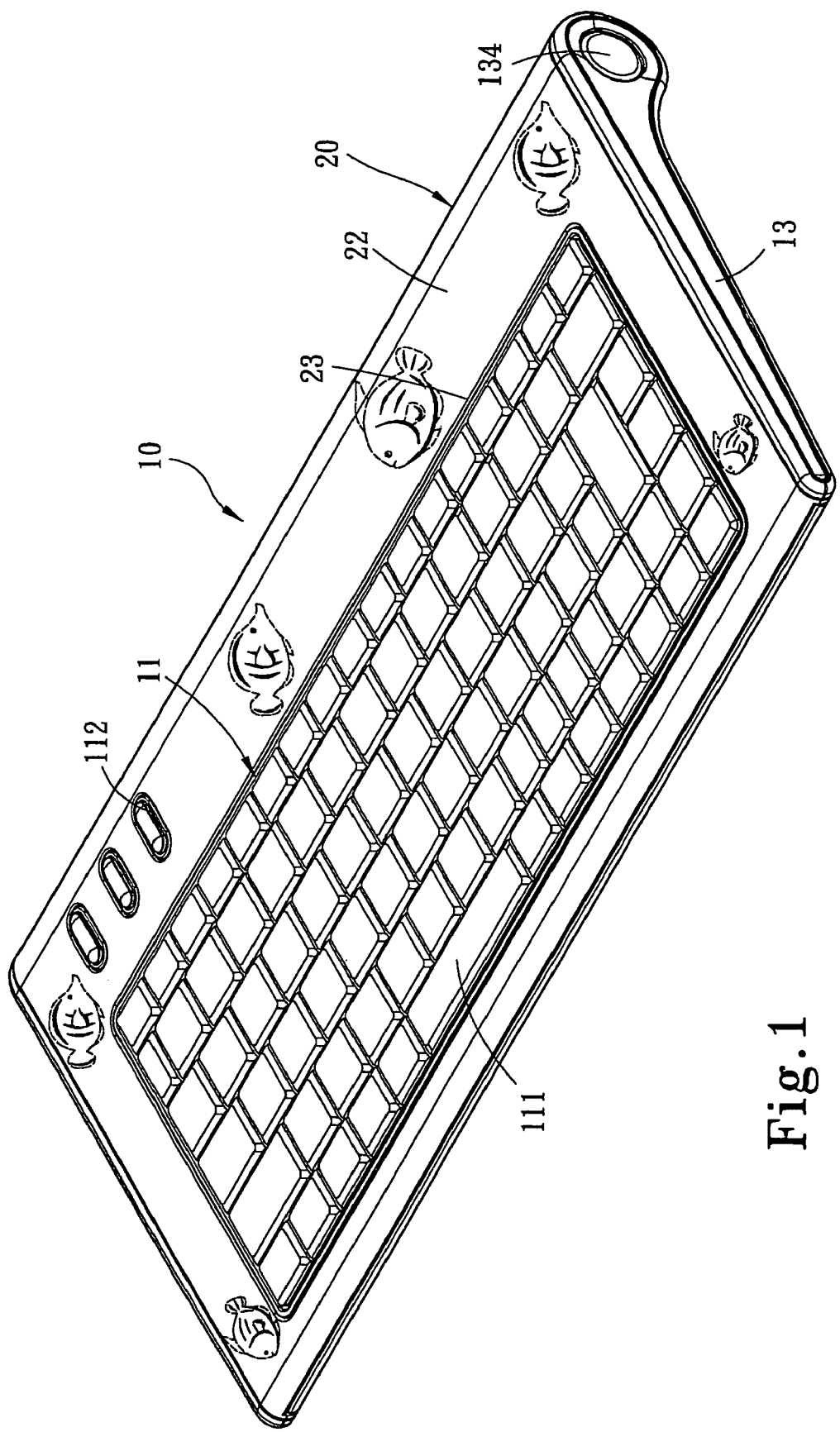
FIG. 1 is a perspective view of the present invention.
Figure 2:
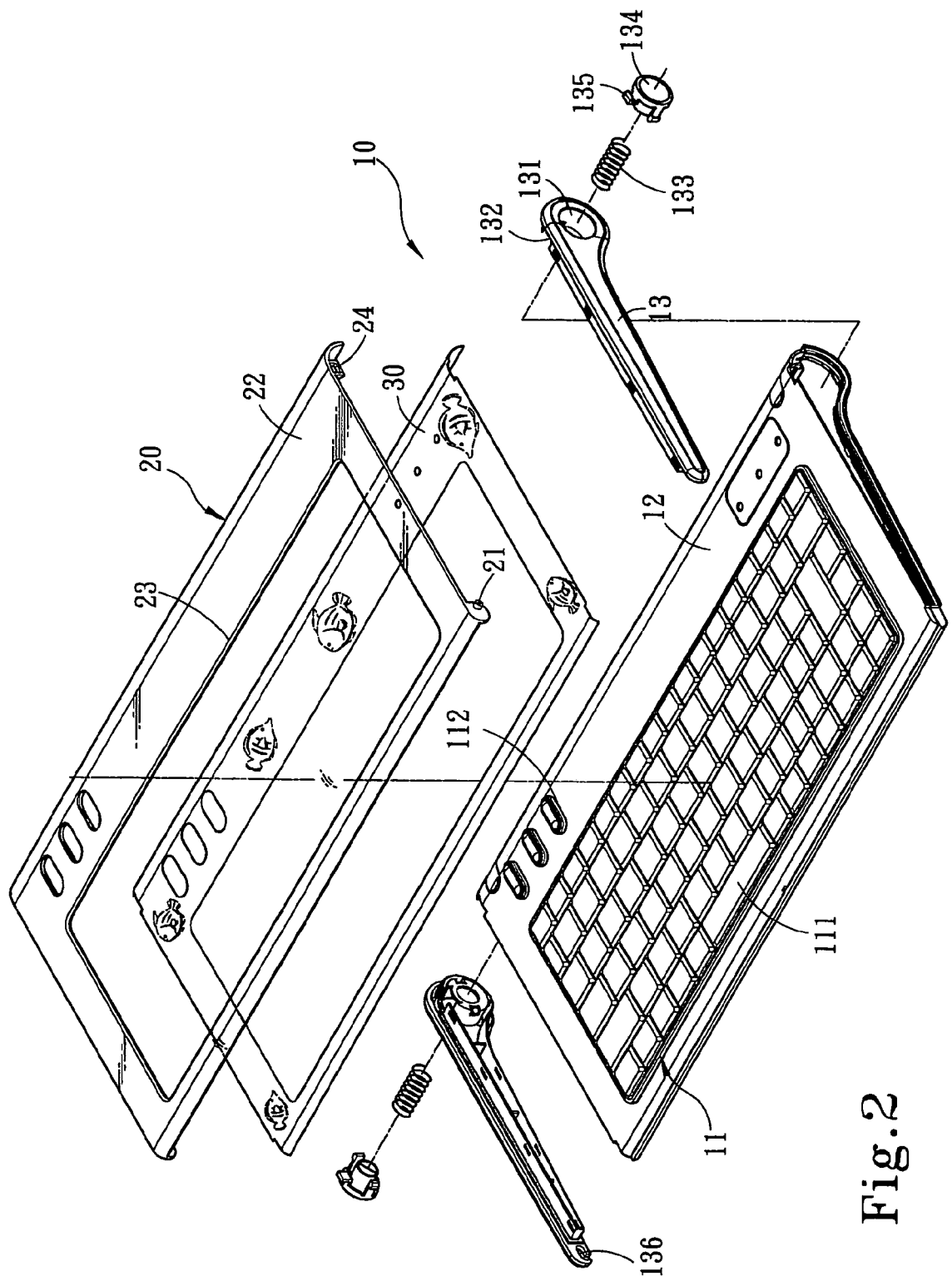
FIGS. 2 and 3 are exploded views of the present invention.
Figure 3:
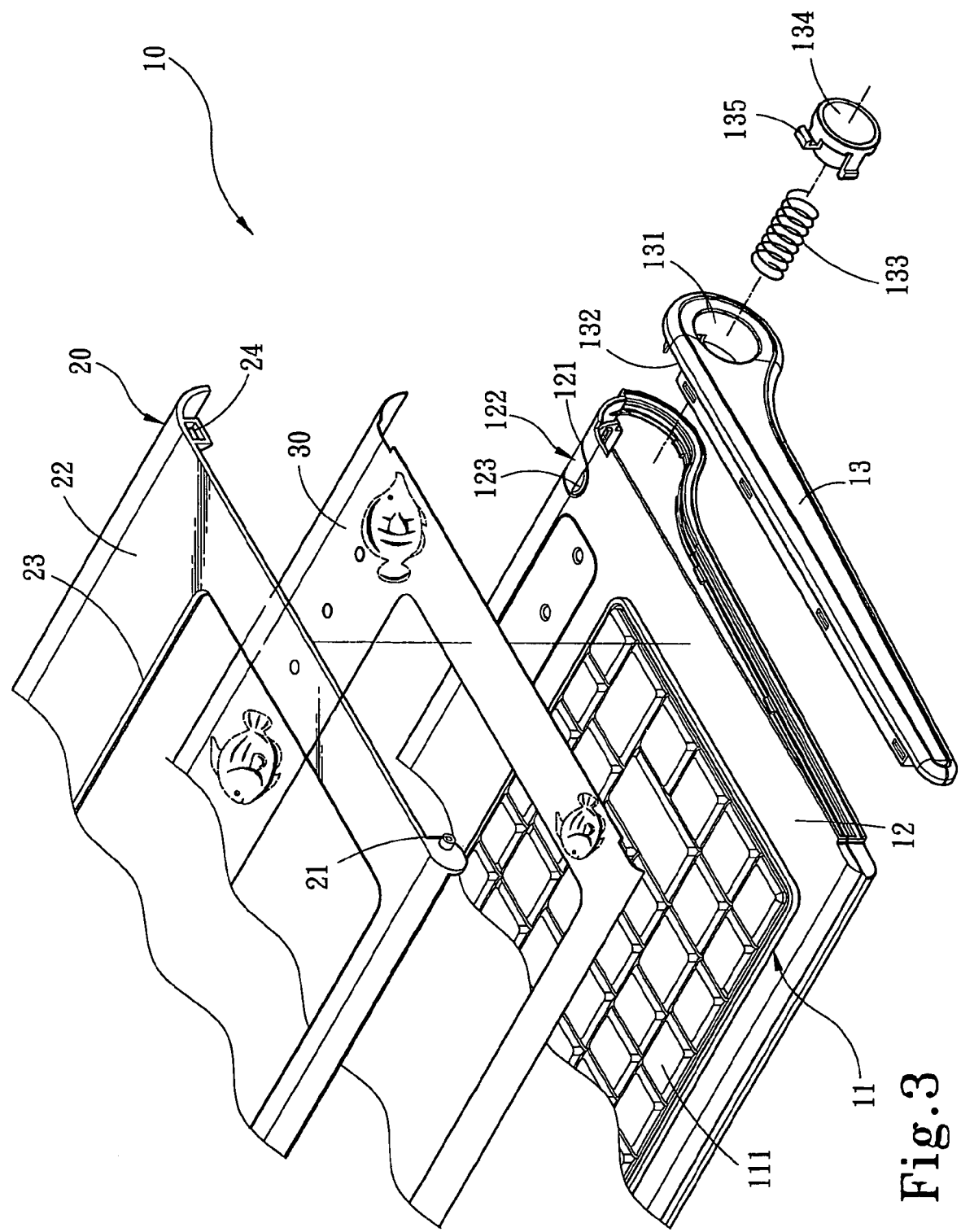
Figure 4A:
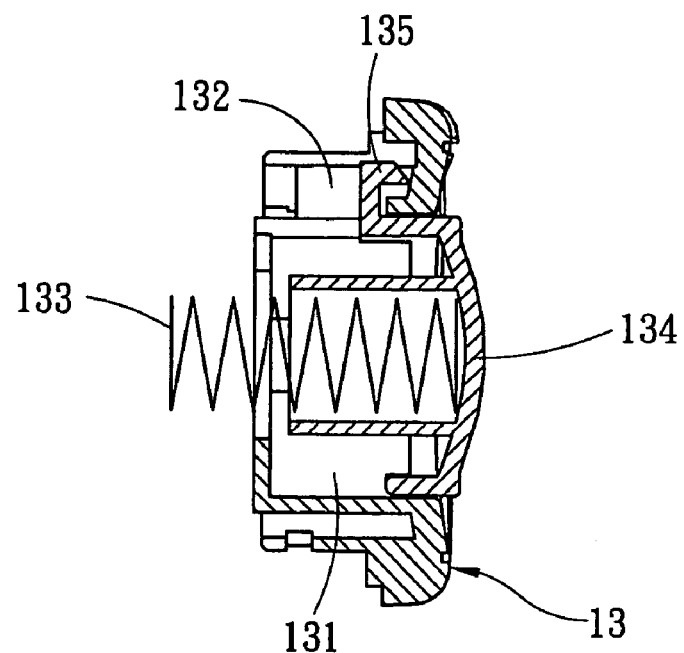
FIGS. 4A through 5B are schematic views of the present invention in assembling conditions.
Figure 4B:
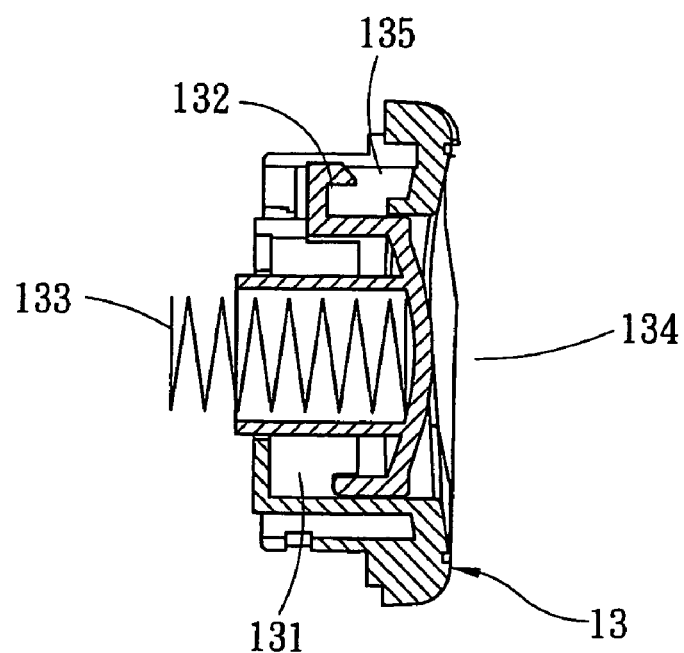
Figure 5A:
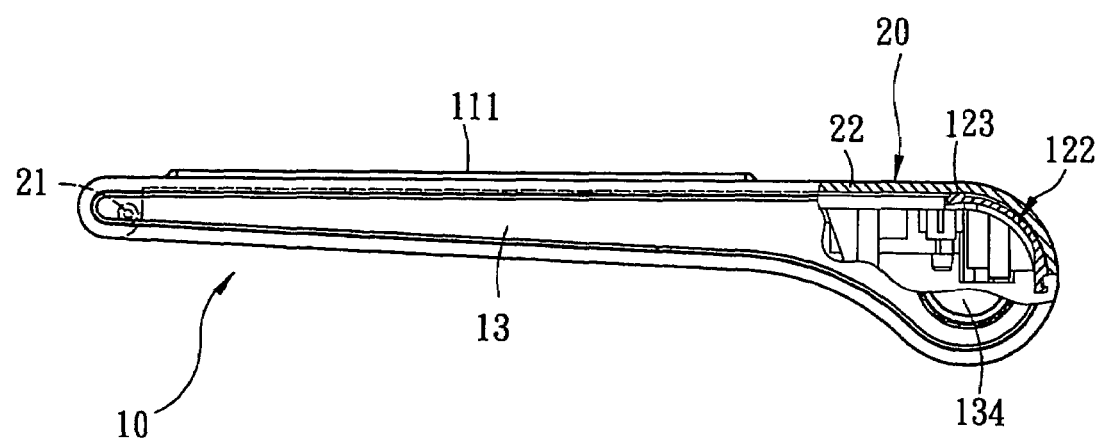
Figure 5B:
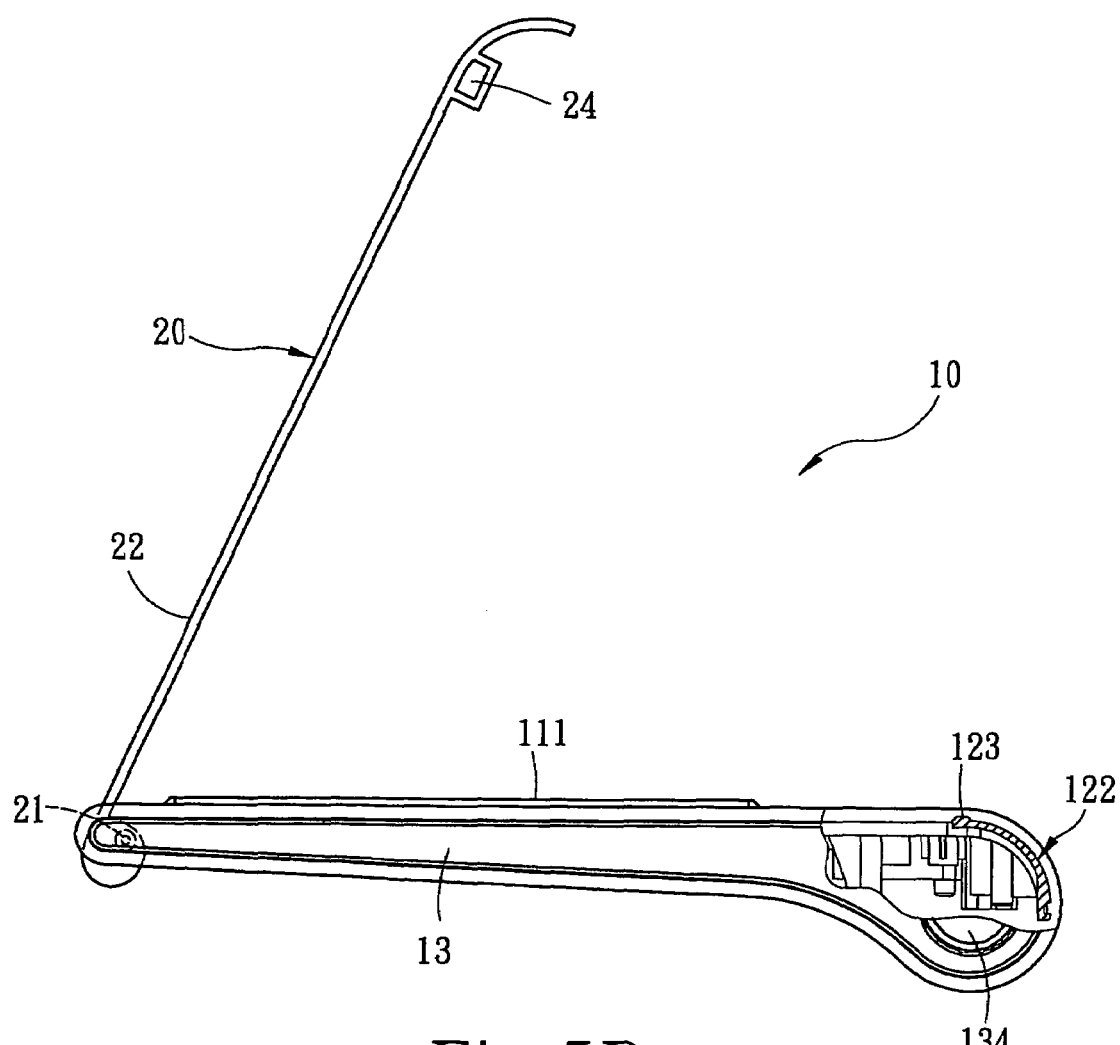

Please referring to FIGS. 1, 2 and 3, the present invention is adopted on a keyboard that is for data entry use. The keyboard includes:

a keyboard body 10 which has a keyboard operation zone 11 and a keyboard non-operation zone 12. The keyboard operation zone 11 includes a character zone 111 for entering data and a light indication zone 112 for displaying operation condition. The rest area of the keyboard body 10 where no elements are mounted is the keyboard non-operation zone 12. The keyboard body 10 has two sides each is coupled with a fastening assembly. The fastening assembly includes a fastening member 13 which has an axle hole 136 on one end and a fastening space 131 on other end. The fastening space 131 has a notch 132, and houses an elastic element 133 and a push button 134 depressing the elastic element 133. The push button 134 has a latch hook 135. The keyboard non-operation zone 12 has a carved trough 121 which holds an elastic bucking blade 122. The bucking blade 122 has a boss 123 on one end;

a see-through upper lid 20 made from a transparent or translucent material coupling on the keyboard body 10. The upper lid 20 has an anchor section 21 corresponding to the fastening assembly, a display area 22 corresponding to the keyboard non-operation zone 12 and an operation area 23 corresponding to the keyboard operation zone 11. The operation area 23 is a cut away opening. The anchor section 21 is a stub shaft engageable with the axle hole 136 so that the upper lid 20 may be turned about the anchor section 21 to open or close relative to the keyboard body 10. The upper lid 20 further has a latch section 24 engageable with the latch hook 135; and an ornamental panel 30 sandwiched between the keyboard non-operation zone 12 of the keyboard body 10 and the display area 22 of the upper lid 20. The ornamental panel 30 is a standard cardboard mating the size and shape of the display area 22 and printed with pictures or animation figures, or photo or patterns (such as wedding pictures, children photos and the like) desired by users.

Refer to FIGS. 4A through 5B, for assembly of the invention, users choose a desired ornamental panel 30 to cover the keyboard non-operation zone 12 of the keyboard body 10; turn the upper lid 20 about the anchor section 21 relative to the keyboard body 10 to couple the upper lid 20 on the keyboard body 10 with the display area 22 pressing the boss 123 of the bucking blade 122 and move the bucking blade 122 downwards to store elastic power; the latch section 24 depresses the latch hook 135 which compresses the elastic element 133 to store elastic force; and the latch section 24 slides over the sloped surface of the latch hook 135 to release the elastic force of the elastic element 133 so that latch hook 135 is engaged with the latch section 24. Thus assembly of the ornamental panel 30 is finished.

Figure 6:
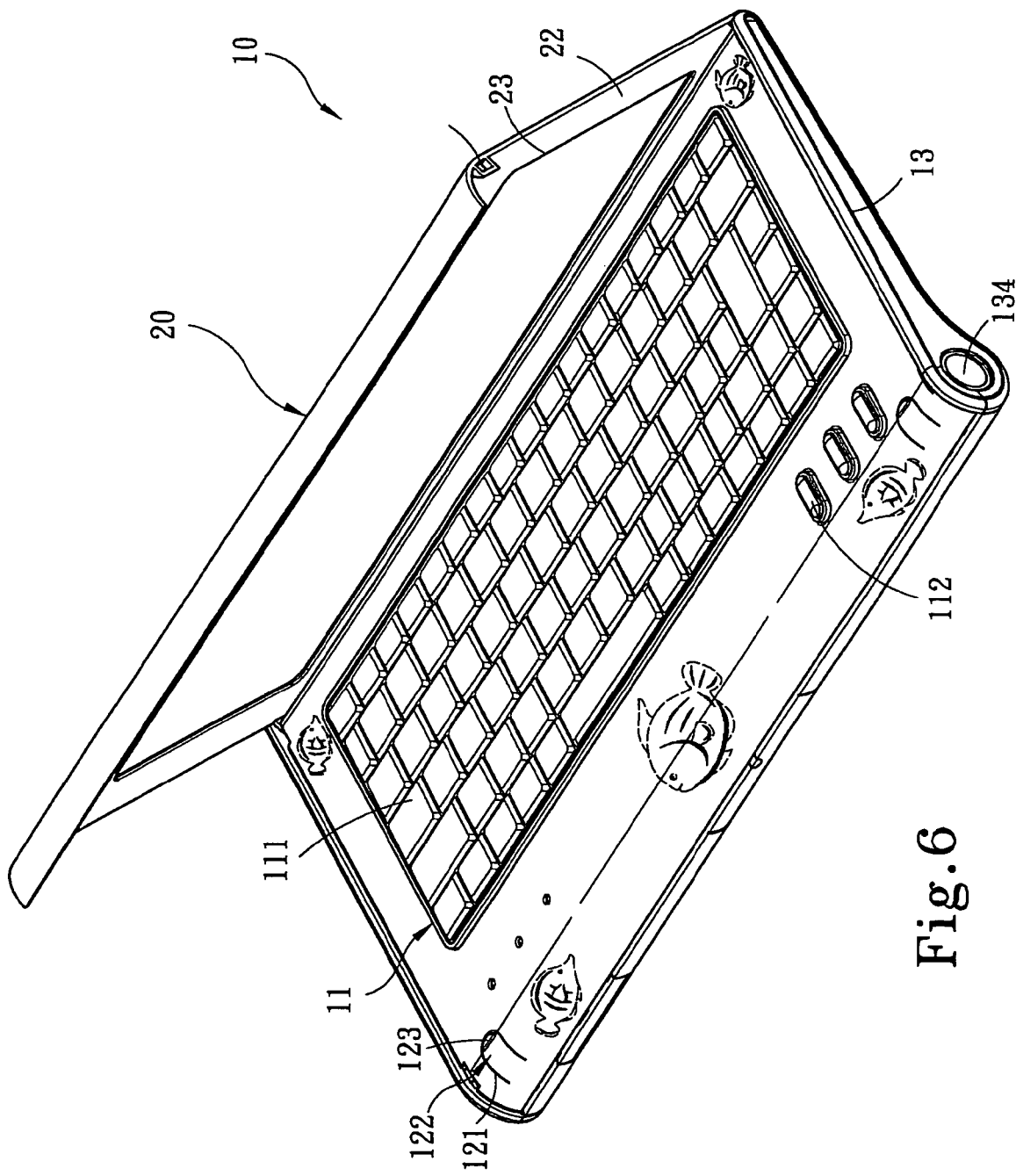
FIG. 6 is a schematic view of the upper lid in an open condition.

Referring to FIG. 6, when a user wants to replace a new ornamental panel 30, depress the push button 134 and the elastic element 133 to disengage the latch hook 135 from the latch section 24. The bucking blade 122 releases the elastic power to lift the upper lid 20 slightly upwards so that user can turn the upper lid 20 about the anchor section 21 and open the upper lid 20. Then the existing ornamental panel 30 may be removed for replacing a new one. Assembly is same as previously discussed.

As the see-through upper lid 20 is made from the transparent or translucent material, users can see the patterns on the ornamental panel 30 through the display area 22. The upper lid 20 thus designed is simple, and replacement of the ornamental panel 30 is easy.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A keyboard having a lifting lid and a replaceable panel, comprising:
    a keyboard body which has a keyboard operation zone and a keyboard non-operation zone, and is coupled with a fastening assembly;
    a see-through upper lid located on the keyboard body having an anchor section engageable with the fastening assembly, a display area corresponding to the keyboard non-operation zone and an operation area corresponding to the keyboard operation zone; and
    an ornamental panel sandwiched between the keyboard non-operation zone and the display area.

2. The keyboard having a lifting lid and a replaceable panel of claim 1, wherein the see-through upper lid is made from a transparent material.

3. The keyboard having a lifting lid and a replaceable panel of claim 1, wherein the see-through upper lid is made from a translucent material.

4. The keyboard having a lifting lid and a replaceable panel of claim 1, wherein the fastening assembly includes a fastening member coupling on the keyboard body that has an axle hole, the anchor section being a stub shaft coupling with the axle hole such that the upper lid is turnable relative to the keyboard for opening or closing.

5. The keyboard having a lifting lid and a replaceable panel of claim 4, wherein the fastening member has a fastening space which has a notch and houses an elastic element and a push button which depresses the elastic element, the push button having a latch hook, the upper lid having a latch section mating and engageable with the latch hook.

6. The keyboard having a lifting lid and a replaceable panel of claim 1, wherein the fastening assembly is located on two lateral sides of the keyboard body.

7. The keyboard having a lifting lid and a replaceable panel of claim 1, wherein the keyboard non-operation zone has a carved trough which holds an elastic bucking blade.

8. The keyboard having a lifting lid and a replaceable panel of claim 7, wherein the bucking blade has a boss on one end.

9. The keyboard having a lifting lid and a replaceable panel of claim 1, wherein the keyboard operation zone includes a character zone and a light indication zone.

10. The keyboard having a lifting lid and a replaceable panel of claim 1, wherein the ornamental panel is formed in a shape mating the display area of the upper lid.

* * * * *